United States Patent
Kupershtok et al.

(10) Patent No.: US 9,678,800 B2
(45) Date of Patent: Jun. 13, 2017

(54) OPTIMUM DESIGN METHOD FOR CONFIGURATION OF SERVERS IN A DATA CENTER ENVIRONMENT

(71) Applicant: International Business Machines Corporation, Armonk, NY (US)

(72) Inventors: Aharon Kupershtok, Ramat Gan (IL); Onn M Shehory, Yahud-Monosson (IL)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 14/168,016

(22) Filed: Jan. 30, 2014

(65) Prior Publication Data
US 2015/0212829 A1     Jul. 30, 2015

(51) Int. Cl.
*G06F 9/50*        (2006.01)
*G06F 15/177*      (2006.01)

(52) U.S. Cl.
CPC .......... *G06F 9/5027* (2013.01); *G06F 9/5061* (2013.01); *G06F 15/177* (2013.01)

(58) Field of Classification Search
CPC ............... G06F 11/3093; G06F 9/4406; H04L 41/0803; H04L 41/0806; H04N 21/21; H04W 28/08; H05K 7/1487
USPC .......................................................... 713/1
See application file for complete search history.

(56) References Cited

U.S. PATENT DOCUMENTS

| | | | |
|---|---|---|---|
| 7,221,677 B1* | 5/2007 | Reed | H04L 45/30 370/388 |
| 7,263,069 B2* | 8/2007 | Yegenoglu | H04L 41/5009 370/254 |
| 7,640,453 B2* | 12/2009 | Li | G06F 9/5061 713/1 |
| 8,255,516 B1* | 8/2012 | Zhang | H04L 67/10 709/203 |
| 2004/0004939 A1* | 1/2004 | Yegenoglu | H04L 41/5009 370/252 |

(Continued)

FOREIGN PATENT DOCUMENTS

WO    2012154751    11/2012

OTHER PUBLICATIONS

Mudigonda et al., "Taming the Flying Cable Monster: A Topology Design and Optimization Framework for Data-Center Networks", USENIXATC'11 Proceedings of the 2011 USENIX conference on USENIX annual technical conference, p. 8.

(Continued)

Primary Examiner — Thomas Lee
Assistant Examiner — Santosh R Poudel
(74) Attorney, Agent, or Firm — Ziv Glazberg

(57) ABSTRACT

A method, system and product for automatic systems configuration. The method comprising: obtaining utilization of workloads of processing units, wherein at least a portion of the workloads include transferring of data to other processing units; and automatically determining, by a processor, a system configuration, wherein the system configuration comprises assigning to plurality of physical locations the processing units, wherein in at least one physical location the system configuration assigns two or more processing units, wherein the system configuration indicates throughput requirement between the plurality of physical locations.

13 Claims, 3 Drawing Sheets

(56) References Cited

U.S. PATENT DOCUMENTS

| | | | |
|---|---|---|---|
| 2005/0021704 A1 | 1/2005 | Larson et al. | |
| 2005/0120160 A1* | 6/2005 | Plouffe | G06F 9/45537 711/1 |
| 2006/0248324 A1 | 11/2006 | Fung | |
| 2006/0277324 A1* | 12/2006 | Aldereguia | G06F 13/4072 710/1 |
| 2007/0005320 A1* | 1/2007 | Vinberg | G06F 17/50 703/13 |
| 2008/0092122 A1* | 4/2008 | Caprihan | G06F 11/3409 717/127 |
| 2008/0312885 A1* | 12/2008 | Chu | G06F 17/11 703/2 |
| 2009/0132699 A1* | 5/2009 | Sharma | G05D 23/1917 709/224 |
| 2009/0172125 A1* | 7/2009 | Shekhar | G06F 11/2025 709/215 |
| 2009/0285102 A1* | 11/2009 | Daily | H04L 41/0866 370/241 |
| 2010/0199267 A1* | 8/2010 | Rolia | G06Q 10/06 717/135 |
| 2011/0077795 A1* | 3/2011 | VanGilder | G06F 1/206 700/300 |
| 2011/0138391 A1* | 6/2011 | Cho | G06F 9/4881 718/102 |
| 2011/0208737 A1* | 8/2011 | Shmueli | G06F 17/30923 707/737 |
| 2011/0276583 A1* | 11/2011 | Stone | G06F 9/5061 707/769 |
| 2012/0008945 A1 | 1/2012 | Singla et al. | |
| 2012/0016971 A1* | 1/2012 | Wakai | G06F 13/4022 709/220 |
| 2012/0020242 A1* | 1/2012 | McLaren | H04L 41/12 370/254 |
| 2012/0185624 A1* | 7/2012 | Dang | G06F 13/40 710/104 |
| 2013/0121146 A1* | 5/2013 | Hassidim | H04L 47/762 370/230 |
| 2014/0052973 A1* | 2/2014 | Puttaswamy Naga | G06F 9/45558 713/1 |
| 2015/0134779 A1* | 5/2015 | Thompson | H04L 67/06 709/219 |

OTHER PUBLICATIONS

Ahn et al., "HyperX: Topology, Routing, and Packaging of Efficient Large-Scale Networks", SC '09 Proceedings of the Conference on High Performance Computing Networking, Storage and Analysis, Article No. 41, 2009.

Curtis et al., "Rewire: An Optimization-based Framework for Unstructured Data Center Network Design", IEEE Proceedings INFOCOM, pp. 1116-1124, 2012.

* cited by examiner

OPTIMUM DESIGN METHOD FOR CONFIGURATION OF SERVERS IN A DATA CENTER ENVIRONMENT

TECHNICAL FIELD

The present disclosure relates to system configuration in general, and to configuration of distributed systems, in particular.

BACKGROUND

Computerized systems may include a plurality of Information Technology (IT) elements, such as for example hardware servers, that are inter-connected to allow communication between them. The IT elements, also referred to as processing units, may be placed in different physical locations, such as chassis in which the servers are installed.

A physical location may be used to install more than a single IT element, such as in case several servers are installed in the same chassis. As the system may require communication between the different servers, in order to support such a requirement, cables or other hardware components may be installed. As an example, cables may be installed to connect each physical location of the system.

BRIEF SUMMARY

One exemplary embodiment of the disclosed subject matter is a computer-implemented method comprising: obtaining utilization of workloads of processing units, wherein at least a portion of the workloads include transferring of data to other processing units; and automatically determining, by a processor, a system configuration, wherein the system configuration comprises assigning to plurality of physical locations the processing units, wherein in at least one physical location the system configuration assigns two or more processing units, wherein the system configuration indicates throughput requirement between the plurality of physical locations.

Another exemplary embodiment of the disclosed subject matter is a computerized apparatus having a processor, the processor being adapted to perform the steps of: obtaining utilization of workloads of processing units, wherein at least a portion of the workloads include transferring of data to other processing units; and automatically determining a system configuration, wherein the system configuration comprises assigning to plurality of physical locations the processing units, wherein in at least one physical location the system configuration assigns two or more processing units, wherein the system configuration indicates throughput requirement between the plurality of physical locations.

Yet another exemplary embodiment of the disclosed subject matter is a computer program product comprising a non-transitory computer readable medium retaining program instructions, which instructions when read by a processor, cause the processor to perform a method comprising: obtaining utilization of workloads of processing units, wherein at least a portion of the workloads include transferring of data to other processing units; and automatically determining a system configuration, wherein the system configuration comprises assigning to plurality of physical locations the processing units, wherein in at least one physical location the system configuration assigns two or more processing units, wherein the system configuration indicates throughput requirement between the plurality of physical locations.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
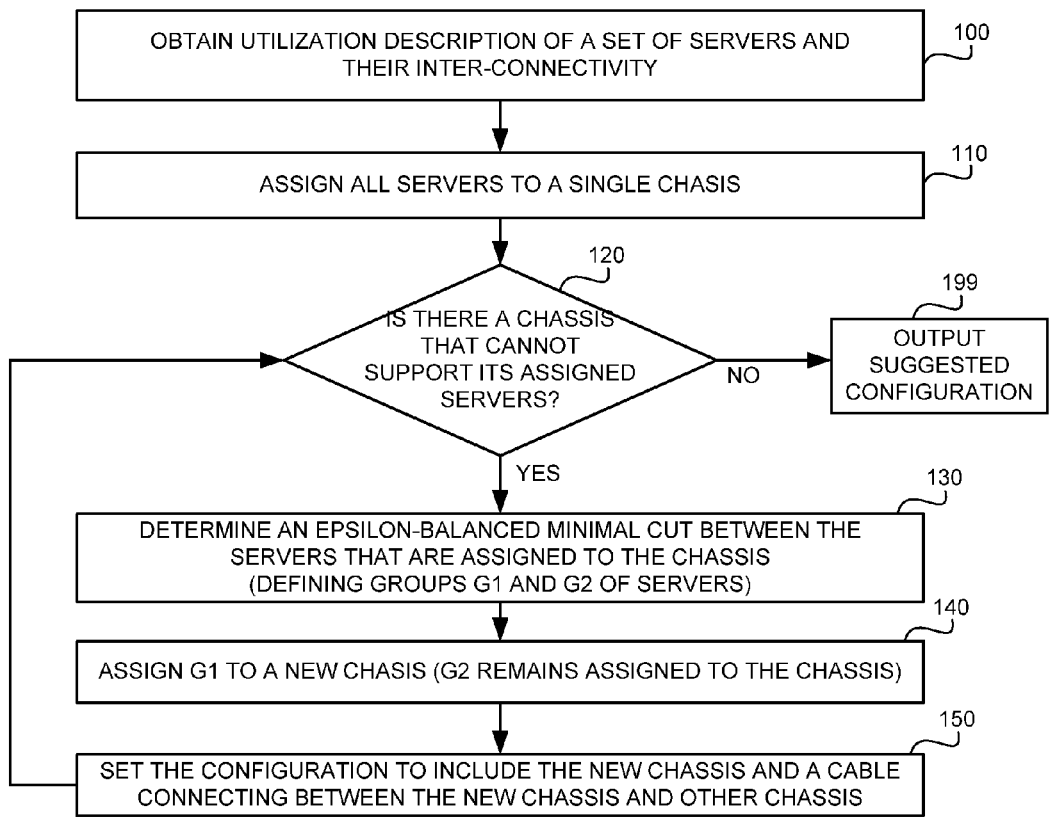
FIG. 1 shows a flowchart diagram of a method, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to automatically define system configuration based on requirements. In some exemplary embodiments, the system configuration may be determined so as to reduce cabling costs of the system, to reduce inter-physical locations bandwidth requirements, or the like.

The disclosed subject matter refers to servers and chassis as example embodiments of processing units and physical locations. However, it will be noted that the disclosed subject matter is not limited to such embodiments and that such embodiments are used solely for the purpose of clarity of explanation.

In some exemplary embodiments, a set of throughput workload requirements to be serviced by the servers and by a network interconnecting them may be provided. The throughput requirements may indicate amounts of data per time unit to be transferred to/from those elements.

In some exemplary embodiments, there may be a set of physical locations in which the servers can be placed as part of the system (e.g. chassis in which plurality of servers can be installed). Optionally, disparate physical locations are to be interconnected via network cables and other connectors. These cables and connectors each have a bandwidth and a cost associated with them.

The disclosed subject matter may be utilized to determine the placement of the servers onto system chassis such that the total cost of cabling between locations is minimized and throughput requirements are addressed. Additionally or alternatively, the disclosed subject matter may be utilized to minimize the total inter-chassis throughput.

Applicants have become aware that cables are usually not considered an expensive component of interconnected systems. Even when cables are expensive, it is usually assumed that only a few cables serve for interconnecting disparate physical locations of a system. The disclosed subject matter, however, may be useful for systems that may be interconnected by hundreds of cables, each of which may be very costly, amounting to a significant factor in the overall cost of the system.

One technical solution is to obtain utilization of workloads of processing units and automatically determine assignment of processing units to physical locations based on the utilization. The utilization may be a requirement, an average measurement, or the like.

The utilization of workloads of the servers may include information such as for example, data throughput, disk throughput (e.g., rate of writing to disk or other local storage), CPU utilization, memory utilization, or the like. In some exemplary embodiments, the utilization may be based on a specification, on a priori given requirements, on monitoring information, or the like. The utilization requirement may be affected by software components being executed by the server, such as for example, applications, software servers, Virtual Machines (VMs), or the like.

In some exemplary embodiments, an initial configuration is defined as including all servers in a single physical location. The servers are then partitioned into two groups, one of which would be considered as being installed on the physical location and the other is moved to a different physical location. Such a process may be iteratively performed until each physical location supports all its assigned servers and/or their respective workloads (e.g., can include the number of servers, supports the aggregated utilization requirements of the system, and the like).

In some exemplary embodiments, the groups may be determined based on a minimum cut-graph in a graph that models the servers. Optionally, the minimum cut-graph may be epsilon balanced.

It will be noted that the disclosed subject matter may refer to moving a server from a first physical location to a second physical location. However, unless expressly stated to the contrary, the change in location is a logical change. In some exemplary embodiments, the disclosed subject matter merely computes a configuration in which the servers are moved, without actually moving the servers before the computation is terminated. In some exemplary embodiments, the servers may be installed (e.g., physically moved) based on the computed configuration.

One technical effect of the disclosed subject matter may be determining a near-optimal and balanced inter-location throughput which minimizes the number of cables and their total costs. The near-optimal solution may be considered as an approximated solution to the minimization problem which may be a NP-hard problem.

Referring now to FIG. 1 showing a flowchart diagram of a method, in accordance with some exemplary embodiments of the disclosed subject matter.

In Step 100, utilization description of a set of servers and their inter-connectivity. The utilization description may, for example, include an indication for each server its expected, required or actual data throughput to other servers. As an example, Server 1 may be described as having 2 Mb/s throughput to Server 2, 10 Mb/s throughput to Server 3, 500 Mb throughput to Server 4 and the like. In some exemplary embodiments, the utilization description may further include information regarding other performance metrics such as for example CPU utilization, disk throughput, memory utilization, or the like.

In Step 110, all servers are initially assigned to a single chassis. In such a configuration, the total inter-chassis throughput may be 0 and no cables may be required.

In Step 120, the current configuration—whether an initial configuration set at Step 110 or a configuration that is an outcome performing steps 130-150—is checked to see whether it is a legal configuration. A configuration may be deemed as a legal configuration if every chassis supports its assigned servers. Put different, a configuration is not legal if any chassis cannot support the assigned servers. A chassis may not support the assigned servers due to many different reasons, such as for example, because the number of assigned servers exceed the number of slots in the chassis, because the aggregated disk or network throughput is above the capacity of the chassis, because the memory utilization requirement exceeds the supported memory utilization by the chassis, because the aggregated required memory capacity is not supported by the chassis, because loading all the servers onto the chassis would result in CPU utilization reaching 100% or its proximity (i.e., over 80%, over 85%, or the like), or the like.

In some exemplary embodiments, with respect to CPU utilization, CPU utilization on one machine may differ than that on another machine. The CPU utilization for the chassis may be computed using conversion tables which may be indicative of the CPU utilization on the chassis based on the CPU utilization on another chassis.

In case there is at least one chassis which does not support its assigned servers, Steps 130-150 may be performed.

In Step 130, an epsilon-balanced minimal cut between the servers that are assigned to the chassis may be defined. In some exemplary embodiments, a graph based on the servers that are assigned to the chassis may be determined wherein vertexes of the graph represent servers, edges between vertexes indicates that the servers communicate with one another. The edges may be weighted indicating a throughput between the servers, such as is indicated by the utilization description of Step 100. A cut in such a graph may divide the servers into two disjoint sub-groups (e.g., G1 and G2) that are connected by at least one edge. The total weights of the edges that connect the sub-groups indicate a total throughput between the servers in the different sub-groups. A minimal cut of the graph indicates a partition into the sub-groups that provides a minimal inter-group throughput. If each such sub-group is allocated to a different chassis, such a minimal cut provides a partition that is characterized in a minimal inter-chassis throughput, and thus a most lenient cabling requirement.

In some exemplary embodiments, a balanced cut may be identified. A cut may be deemed as epsilon balanced if in accordance to a predetermined metric, the two groups that are defined by the cut differ by no more than a predetermined constant, denoted as epsilon. A minimal epsilon balanced cut, also referred to as a minimal balanced cut, provides a balanced partition of the servers while driving the inter-group throughput to a minimal value.

In some exemplary embodiments, the metric for determining whether a cut is balanced may be based on a predetermined performance metric, e.g., total CPU utilization, memory utilization or the like. Additionally or alternatively, a combination of several performance metrics may be utilized. Additionally or alternatively, balancing may be determined based on a performance metric the value of which is maximal (e.g., max(metric1, metric2, metric3, . . . )). Other functions which are based on different performance metrics may be utilized to be used for determining whether the cut is balanced.

In some exemplary embodiments, a minimal cut may be determined using algorithms such as but not limited to Stoer, Mechthild, and Frank Wagner. "A simple min-cut algorithm." Journal of the ACM (JACM) 44.4 (1997): 585-591, which is hereby incorporated by reference in its entirety. Such an algorithm may be modified to ensure that the minimal cut graph is also epsilon balanced.

In Step 140, servers associated with one of the groups (e.g., G1) is assigned to a new chassis while the rest of the servers (e.g., associated with G2) remain assigned to the original chassis. The new assignment of servers reduces the requirement from the chassis and therefore may result in the chassis supporting the new assignment.

In Step 150, the system configuration is modified (e.g., from the initial configuration set in Step 110) to include the new chassis and a cable connecting between the new chassis and other chassis.

Steps 120-150 may be performed iteratively thereby modifying the initial configuration until reaching a configuration in which every chassis can support its assigned servers. When such a configuration is determined, Step 199 may be performed in which the configuration is outputted as a suggested configuration. The output may indicate a number of chassis and servers to be assigned in each chassis. The output may indicate the inter-chassis throughput requirement, estimated costs of cabling, or the like. In some exemplary embodiments, the system may be installed according to the suggested configuration.

It will be noted that in some embodiments, one or more servers may be a-priori associated with a given chassis, such as due to security requirements, backup purposes or other reasons. In such a case, the initial configuration which is set up in Step 110, may be based on these requirements.

Figure 2A:
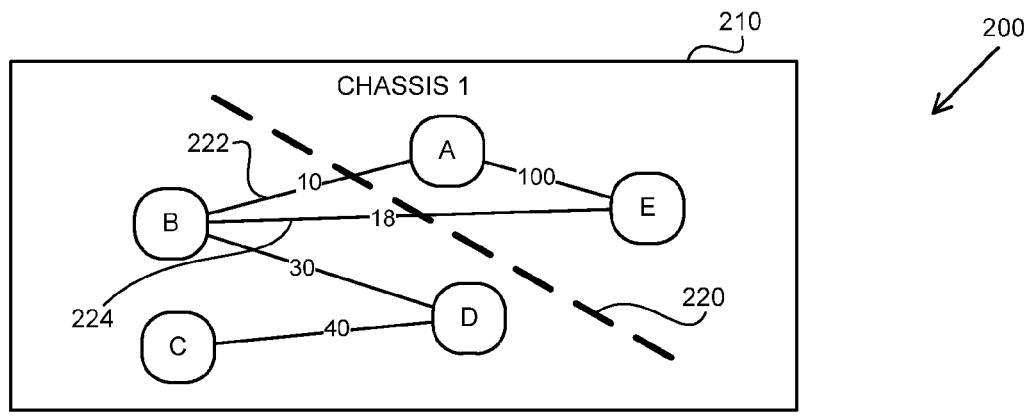
FIG. 2A-2B show illustrations of configurations, in accordance with some exemplary embodiments of the disclosed subject matter.

Referring now to FIG. 2A showing an illustration of a configuration, in accordance with some exemplary embodiments of the disclosed subject matter. Configuration 200 is illustrated as including a single chassis, Chassis 210, to which five servers are assigned (Servers A, B, C, D, E). Configuration 200 may be an initial configuration determined in Step 110 of FIG. 1.

In case Chassis 210 cannot support all its assigned servers, a minimal balanced cut graph may be identified. Cut 220 separates servers A and E from servers B, C, D while maintaining a minimal inter-group throughput of 28 Mb/s (summation of the weights of edges 222 and 224).

Figure 2B:
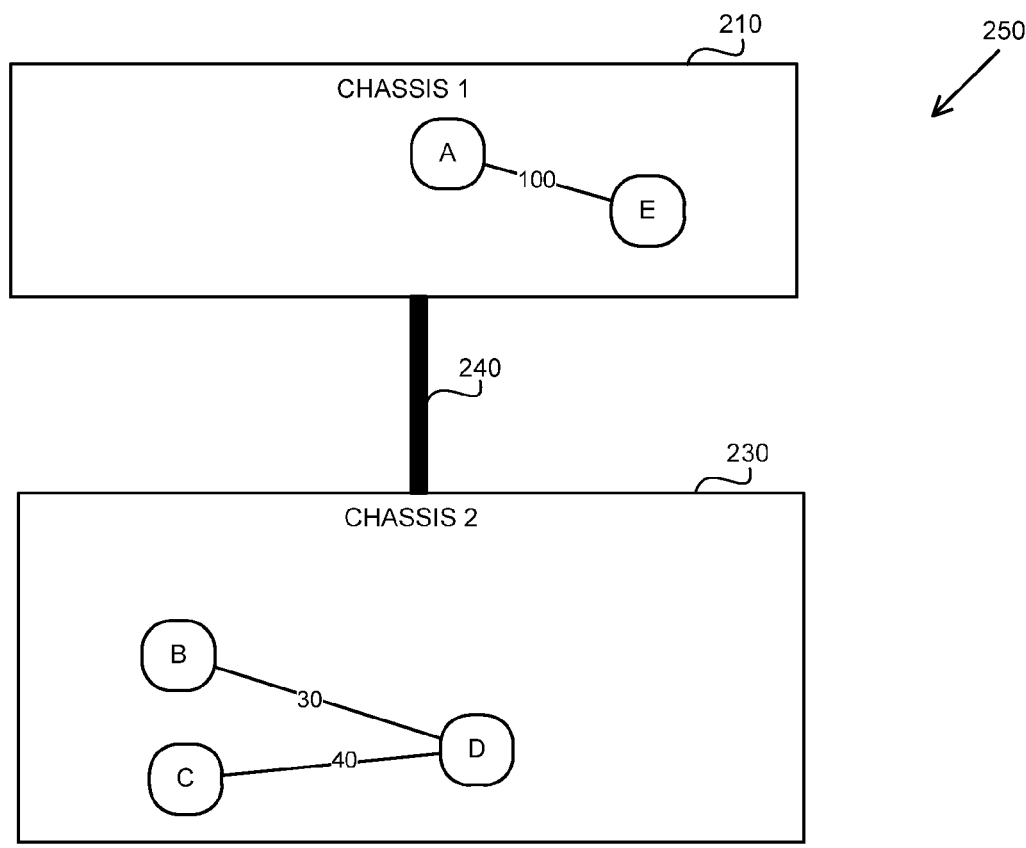

Reference is now made to FIG. 2B. Based on Cut 220, a Modified Configuration 250 may be determined Modified Configuration 250 may indicate that Chassis 250 includes only servers A and E, while a new chassis, Chassis 230, includes Servers B, C, D.

Modified Configuration 250 may indicate that a Cable 240 is required between Chassis 210 and Chassis 230. Cable 240 may be indicated as required to support throughput of 28 Mb/s.

In some exemplary embodiments, in response to reaching Modified Configuration 250 additional modifications to these or other chassis may be required in order for the configuration to be legal. A configuration may be deemed as legal if every chassis can support its assigned servers.

Figure 3:
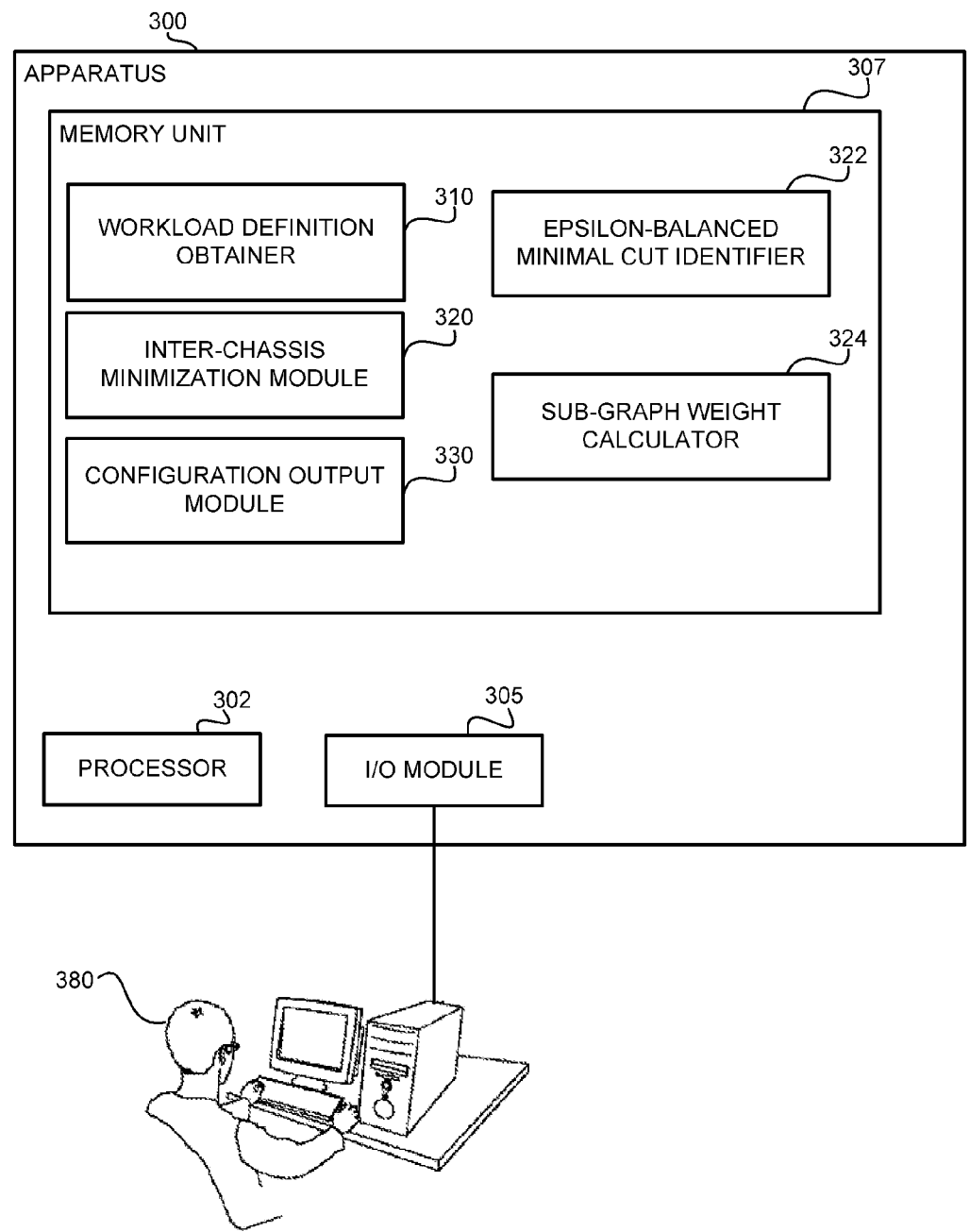
FIG. 3 shows a block diagram of an apparatus, in accordance with some exemplary embodiments of the disclosed subject matter.

Referring now to FIG. 3 showing a block diagram of components of an apparatus, in accordance with some exemplary embodiments of the disclosed subject matter. An apparatus 300 may be a computerized apparatus adapted to perform methods such as depicted in FIG. 1.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it sub-components.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation.

In some exemplary embodiments, the I/O Module 305 may be utilized to provide an interface to a User 380 to interact with Apparatus 300, such as to provide the determined configuration to User 380, to allow User 380 to input workload definition to Apparatus 300, or the like.

In some exemplary embodiments, Apparatus 300 may comprise a Memory Unit 307. Memory Unit 307 may be persistent or volatile. For example, Memory Unit 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 307 may retain program code operative to cause Processor 302 to perform acts associated with any of the steps shown in FIG. 1.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

Workload Definition Obtainer 310 may be configured to obtain workload characterization of servers in the system, such as obtained in Step 100 of FIG. 1.

Inter-Chassis Minimization Module 320 may be configured to determine a configuration of the system in which the inter-chassis throughput is minimized or approximately minimized. In some exemplary embodiments, Inter-Chassis Minimization Module 320 may define a graph based on the servers and throughput therebetween and utilized an Epsilon-Balanced Minimal Cut Identifier 322 to identify determine the assignments of servers to chassis, such as that the inter-chassis throughput is relatively reduced. It will be noted that one exemplary embodiment is a greedy algorithm in which the overall solution, in some cases, may not be the minimal solution.

In some exemplary embodiments, Epsilon-Balanced Minimal Cut Identifier 322 may utilize a Sub-Graph Weight Calculator 324. Sub-Graph Weight Calculator 324 may compute a weight of a sub-graph to be used in checking whether or not a cut of a graph is balanced or epsilon-balanced. In some exemplary embodiments, a weight of a sub-graph may be computed based on an aggregation of one or more performance metrics for each server and/or each pair of servers. As an example, the weight may be computed based on a total CPU utilization by the servers. As another example, the weight may be a total of disk throughput. Additionally or alternatively, the weight may be computed based on the metric which is utilized most by the servers (e.g., a metric in which a normalized value has the greatest value). Additionally or alternatively, the weight may be computed based on an average of several metrics, based on a weighted average of several metrics, or the like.

An Embodiment

Definition: A cut C(S, T) is a partition of the vertex set V of a graph G(V, E) into two disjoint sets S and T.

Definition: The cut-set of C(S, T) is the set of edges (u, v) such that u and v are in different subsets of C.

Definition: The weight of a cut C(S, T) is the sum of weights of all edges (u, v) such that u is in S and v is in T.

Initially assume that all of the servers (denoted as set V) can be assigned to a single chassis that will accommodate them all. At that initial stage the suggested number of chassis would be one. If such an assumption is incorrect, then split the servers into two groups, each of which will be located in a different chassis thereby logically splitting the single chassis into two. Such a process may be performed iteratively.

Herein below pseudo-code of an example of recursive process is provided:

```
CABLEOPTIMIZATION ( V, E ) {
//return value: number of chassis and inter-chassis bandwidth requirement
    if (all v in V fit into one chassis ) return (1,0)
    U = FindMinBalancedCut ( V, E )
    (r, w1) = CableOptimization( U, E(U) )
    (s, w2) = CableOptimization( V-U, E(V-U) )
    return (r+s, w1 + w2 + W(U))
}
FINDMINBALANCEDCUT ( V, E ) {
    Choose an arbitrary vertex a of V. // Possibly, use heuristics
    instead of an arbitrary vertex. Good heuristics may accelerate the process and
    arrive at more optimal results.
    minimumBalancedCut = MinimumCut(V, E, a)
    return minimumBalancedCut
}
MINIMUMCUT (V, E, a) {
    while |V|> 1 { //There are exactly |V|-1 iterations
        MINIMUMCUTPHASE(V, E, a)
        if the cut-of-the-phase is epsilon balanced (using
        CUTISEPSILONBALANCED function or ALTCUTISEPSILONBALANCED)
        and has a weight smaller than the current minimum
        balanced cut then store the cut-of-the-phase as the
        current minimum balanced cut
    }
}
MINIMUMCUTPHASE (V, E, a) { // a is a vertex
    A = {a}
    while A ≠ V {
        add to A the most tightly connected vertex (using
        TightlyConnectedVertex function)
        //The cut of V that separates the vertex added last from the rest of the graph is
        called the cut-of-the-phase
        return the cut-of-the-phase and shrink V and E by
        merging the two vertices added last
        // merging two nodes u and v entails the generation of a new node uv and
        deletion of the original ones. Edges (u,v) and/or (v,u) are eliminated.
        Edges (u,x) and (v,x) are merged to one edge (uv,x)
        and the weight of (uv,x) is the sum of the weights
        of (u,x) and (v,x).
    }
}
TIGHTLYCONNECTEDVERTEX (V, E, A){
    // V is the vertex set, E is the edge set, A is a subset of V
    // For a given partition of V to A and (V-A), find the vertex v in (V-A) which is
    the most connected vertex to the group of vertices A.
    mostConnectedVertex = 0;
    maxWeight = 0;
    for (v in V-A ){
        weight = 0;
        for ( u in A ) {
            if ((v,u) in E ){weight = weight + w(u,v)}
        }
```

```
            if ( maxWeight <weight ) {
                    maxWeight = weight
                    mostConnectedVertex = v
            }
        }
    }
    return mostConnectedVertex
}
CUTISEPSILONBALANCED( V, U, ε ) { // U is & cut-set (and a subset of V)
// The comparison between U and V, which are both sets of vectors of type (CPU util,
memory util, bandwidth util), is done by reducing every vector to a scalar, i.e., we
compute max{ CPU util, memory util, bandwidth util }.
    aggregatedValue = 0;
    for every u=( CPU util, memory util, bandwidth util )
    in U {
        aggregatedValue = aggregatedValue + max{CPU util,
        memory util, bandwidth util}
    }
    aggregatedValue2 = 0;
    For every v=( CPU util, memory util, bandwidth util)
    in V-U {
            aggregatedValue2 = aggregatedValue2 + max {CPU
            util, memory util, bandwidth util};
    }
    if abs( aggregatedValue - aggregatedValue2 ) <= ε
        return true else return false
}
ALTCUTISEPSILONBALANCED ( V, U, ε ){ // U is a subset of V which is a cut-set
// The comparison between U and V, sets of vectors of type (CPU util, memory util,
bandwidth util), is done by aggregating the vectors in U, aggregating the vectors in V-U
and then reducing each aggregation result to a scalar (for comparison purpose), i.e.,
max{ sum of CPU util, sum of memory util, sum of bandwidth util }.
    aggregatedValue = (0, 0, 0);
    for every u=( CPU util, memory util, bandwidth util )
    in U {
        aggregatedValue = aggregatedValue + ( CPU util,
        memory util, bandwidth util )
    }
    aggregatedValue2 = (0, 0, 0);
    for every v=( CPU util, memory util, bandwidth util )
    in V-U {
        aggregatedValue2 = aggregatedValue2 + ( CPU util,
        memory util, bandwidth util )
    }
    if abs( max coordinate value of (aggregatedValue -
    aggregatedValue2 )) <= ε
            return true
        else
            return false
}
```

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   obtaining utilization of workloads of processing units, wherein at least a portion of the workloads include transferring of data to other processing units;
   automatically determining, by a processor, a system configuration, wherein the system configuration comprises assigning to plurality of physical locations the processing units, wherein in at least one physical location the system configuration assigns two or more processing units, wherein the system configuration indicates throughput requirement between the plurality of physical locations,
   wherein the processing units are physical processing units,
   wherein said automatically determining the system configuration comprises:
      defining a configuration in which all processing entities are assigned to a single physical location; and
      iteratively modifying the configuration by splitting processing entities assigned to one physical location to be assigned to two separate physical locations until the configuration is legal, wherein the legal configuration is the system configuration;
      wherein said iteratively splitting is performed based on a minimum cut of a graph representing the processing units, wherein the graph comprises weighted edges representing throughput between the processing units in accordance with the utilization of the workloads; and
      installing a computer system according to the automatically determined system configuration.

2. The computer-implemented method of claim 1, wherein said automatically determining the system configuration comprises: determining an approximated solution to a minimization problem on an inter-physical location throughput.

3. The computer-implemented method of claim 1, wherein the minimum cut is a balanced cut graph in which the minimum cut splits the graph into two sub-graphs which have a utilization summary that is different by no more than a predetermined constant value.

4. The computer-implemented method of claim 1, wherein the processing units are servers and the physical locations are chassis for retaining the servers.

5. The computer-implemented method of claim 1, wherein the utilization of workloads comprises network throughput.

6. The computer-implemented method of claim 1, wherein the utilization of workloads comprises CPU utilization, memory utilization, and disk throughput.

7. A computerized apparatus having a processor, the processor being adapted to perform the steps of:
   obtaining utilization of workloads of processing units, wherein at least a portion of the workloads include transferring of data to other processing units;
   automatically determining a system configuration, wherein the system configuration comprises assigning to plurality of physical locations the processing units, wherein in at least one physical location the system configuration assigns two or more processing units, wherein the system configuration indicates throughput requirement between the plurality of physical locations,
   wherein the processing units are physical processing units,
   wherein said automatically determining the system configuration comprises:
      defining a configuration in which all processing entities are assigned to a single physical location; and
      iteratively modifying the configuration by splitting processing entities assigned to one physical location to be assigned to two separate physical locations until the configuration is legal, wherein the legal configuration is the system configuration;

wherein said iteratively splitting is performed based on a minimum cut of a graph representing the processing units, wherein the graph comprises weighted edges representing throughput between the processing units in accordance with the utilization of the workloads; and installing a computer system according to the automatically determined system configuration.

8. The computerized apparatus of claim 7, wherein said automatically determining the system configuration comprises: determining an approximated solution to a minimization problem on an inter-physical location throughput.

9. The computerized apparatus of claim 7, wherein the minimum cut is a balanced cut graph in which the minimum cut splits the graph into two sub-graphs which have a utilization summary that is different by no more than a predetermined constant value.

10. The computerized apparatus of claim 7, wherein the processing units are servers and the physical locations are chassis for retaining the servers.

11. The computerized apparatus of claim 7, wherein the utilization of workloads comprises network throughput.

12. The computerized apparatus of claim 7, wherein the utilization of workloads comprises CPU utilization, memory utilization, and disk throughput.

13. A computer program product comprising a non-transitory computer readable medium retaining program instructions, which instructions when read by a processor, cause the processor to perform a method comprising:

obtaining utilization of workloads of processing units, wherein at least a portion of the workloads include transferring of data to other processing units;

automatically determining a system configuration, wherein the system configuration comprises assigning to plurality of physical locations the processing units, wherein in at least one physical location the system configuration assigns two or more processing units, wherein the system configuration indicates throughput requirement between the plurality of physical locations, wherein the processing units are physical processing units, wherein said automatically determining the system configuration comprises:

defining a configuration in which all processing entities are assigned to a single physical location; and iteratively modifying the configuration by splitting processing entities assigned to one physical location to be assigned to two separate physical locations until the configuration is legal, wherein the legal configuration is the system configuration;

wherein said iteratively splitting is performed based on a minimum cut of a graph representing the processing units, wherein the graph comprises weighted edges representing throughput between the processing units in accordance with the utilization of the workloads; and installing a computer system according to the automatically determined system configuration.

* * * * *